United States Patent [19]

Richardson

[11] 4,283,502
[45] Aug. 11, 1981

[54] POLYAMIDE RESINS

[75] Inventor: Paul N. Richardson, Wilmington, Del.

[73] Assignee: E. I. Du Pont de Nemours and Company, Wilmington, Del.

[21] Appl. No.: 138,249

[22] Filed: Apr. 7, 1980

Related U.S. Application Data

[63] Continuation-in-part of Ser. No. 34,605, Apr. 30, 1979, abandoned, which is a continuation-in-part of Ser. No. 945,323, Sep. 25, 1978, abandoned.

[51] Int. Cl.$^3$ .............................................. C08L 77/00
[52] U.S. Cl. .................................. 525/66; 260/37 H; 260/42.47
[58] Field of Search ....... 260/857 L, 857 G, 857 UN; 525/66

[56] References Cited

U.S. PATENT DOCUMENTS

| | | | |
|---|---|---|---|
| 2,557,808 | 6/1951 | Walker | 260/857 UN |
| 3,484,403 | 12/1969 | Brunson | 260/857 L |
| 3,496,249 | 2/1970 | Hitzler | 260/857 UN |
| 3,673,277 | 6/1972 | Schmitt | 260/857 UN |
| 3,822,227 | 7/1974 | Hermann | 260/857 UN |
| 3,966,839 | 6/1976 | Sims | 260/857 UN |
| 3,972,961 | 8/1976 | Hammer | 260/857 G |
| 3,976,720 | 8/1976 | Hammer | 260/857 G |
| 4,017,557 | 4/1977 | Hammer | 260/857 G |
| 4,100,223 | 7/1978 | Meyer | 260/857 UN |

FOREIGN PATENT DOCUMENTS

| | | | |
|---|---|---|---|
| 2622973 | 9/1976 | Fed. Rep. of Germany . | |
| 45-30943 | 10/1967 | Japan | 260/857 L |
| 45-30945 | 10/1967 | Japan | 260/857 L |
| 49-20280 | 2/1974 | Japan | 260/857 G |
| 50-98937 | 8/1975 | Japan | 260/857 G |
| 998439 | 7/1965 | United Kingdom . | |
| 1403797 | 8/1975 | United Kingdom | 260/857 L |
| 1440030 | 6/1976 | United Kingdom | 260/857 UN |

OTHER PUBLICATIONS

"In-Situ Acrylic Modification of Nylon 6", Eugene C. Szamborski, Coatings & Plastics Preprints ACS, 8/29–9/2/77.

*Primary Examiner*—Paul Lieberman

[57] ABSTRACT

A melt compounded blend of a nylon resin and a small amount of a finely divided adduct which contains a requisite amount of anhydride functionality. The adduct polymer is found to provide nucleating effects to the resultant blend.

8 Claims, No Drawings

POLYAMIDE RESINS

CROSS-REFERENCE TO RELATED APPLICATIONS

This application is a continuation-in-part of application Ser. No. 34,605, filed Apr. 30, 1979, allowed which is a continuation-in-part of application Ser. No. 945,323, filed Sept. 25, 1978 now abandoned.

FIELD OF THE INVENTION

This invention is directed to polyamide resins containing certain additives which provide nucleating characteristics to the resins.

BACKGROUND OF THE INVENTION

Nucleating agents are usually employed as processing aids primarily to accelerate crystallization from a melt. Acceleration of crystallization results in faster molding cycles, which of course means greater productivity in molding operations. Generally, nucleating agents are believed to provide sites for crystallization of molten polyamide. However, nucleating agents are also identified by their ability to increase tensile strength and stiffness of the polyamide, decrease elongation, and decrease mold shrinkage. The term "nucleating agent" as employed herein, is meant to denote those additives which increase tensile strength and decrease tensile elongation and mold shrinkage.

A deficiency of many nucleating agents is that they also significantly lower the Izod impact strength of the resin compared with that of the polyamide without nucleating agent. In contrast, the nucleating agents employed herein provide nucleating properties to polyamides but do not result in a significant lowering of Izod impact strength.

SUMMARY OF THE INVENTION

The product of this invention is a melt compounded blend consisting essentially of
  (a) a polyamide resin having a molecular weight of at least 5000, and
  (b) an adduct of maleic or fumaric anhydride and a copolymer of ethylene, at least one $C_3$ to $C_6$ $\alpha$-olefin, and at least one nonconjugated diene, said adduct having an anhydride functionality of between about 0.1 and 4.0 milliequivalents of carboxyl groups per 1 gram of adduct, said adduct being present in the blend in an amount such that the anhydride functionality comprises between about 0.7 and 10 equivalents per $10^6$ g of polyamide present; provided that the maximum amount of adduct present is less than 1 percent based on weight of polyamide and adduct; and provided that the adduct is in the form of finely divided particles having an average size less than 0.5 micron.

The process of this invention is a process for preparing the melt compounded blend described above by mixing the polyamide resin and the adduct and melt extruding the mixture.

DESCRIPTION OF THE INVENTION

The polyamide resins used in the blends of this invention are well known in the art and embrace those resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210.

Preferably, the polyamides are those made by the condensation of linear diamines represented by the formula $H_2N-(CH_2)_x-NH_2$, where x is an integer between 6 and 12, with linear dicarboxylic acids represented by the formula $HO_2C-(CH_2)_y-CO_2H$, where y is an integer between 2 and 8. Equally well, these polyamides may be made from amine-forming derivatives of said amines and acids such as esters, acid chlorides, amine salts, etc. Representative dicarboxylic acids used to make the polyamides include adipic acid, pimelic acid, suberic acid, sebacic acid, and dodecanedioic acid, while representative diamines include hexamethylene diamine and octamethylene diamine.

Examples of polyamides include polyhexamethylene adipamide (66 nylon), polyhexamethylene azelamide (69 nylon), polyhexamethylene sebacamide (610 nylon), and polyhexamethylene dodecanoamide (612 nylon), polycaprolactam, (nylon 6), polylauryl lactam, poly-11-amino-undecanoamide, bis-(paraaminocyclohexyl) methane dodecanoamide. It is also possible to use polyamides prepared by the copolymerization of two of the above polymers or terpolymerization of the above polymers or their components, as for example, a polymer made of adipic acid, and isophthalic acid and hexamethylene diamine. Preferably the polyamides are linear with a melting point in excess of 200° C. Also included in the blends of this invention are copolymers, such as a copolymer of nylon 6,6, and polylactams, e.g., nylon 6 (polycaprolactam); and blends of polyamides, such as a mixture of nylon 6,6 and nylon 6. Preferably the condensation polyamide employed herein is polyhexamethylene adipamide (nylon 6,6).

By the term "anhydride functionality" is meant the group

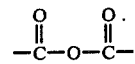

The concentration of anhydride in the adduct is measured by infrared spectroscopy of hot pressed films. The amount of the adduct present to achieve the nucleation effect in the blend depends on the amount of anhydride functionality present in the adduct, provided the amount of polymer present is less than 1%. The amount of anhydride functionality present in the adduct is preferably between about 0.1 and 7 and most preferably between about 0.1 and 2 milliequivalents per gram. Preferably also the amount of adduct present in the blend is between about 0.7 and 7·equivalents of carboxyl groups per $10^6$ g of polyamide polymer. It is believed, although not conclusively demonstrated, that the anhydride function of the adduct polymer reacts with amine ends of the polyamide to provide the nucleating effect seen in the blends.

The adduct may be prepared as described in Flexman U.S. Pat. No. 4,026,067 or Caywood U.S. Pat. No. 3,884,882 and U.S. Pat. No. 4,010,223. It preferably has an inherent viscosity of at least one as measured on 0.1 g of adduct in 100 ml of perchloroethylene at 30° C. Propylene is preferably the $C_3$-$C_6$ $\alpha$-olefin, although it can be 1-butene, 1-pentene or 1-hexene. A preferred class of nonconjugated dienes are monoreactive ones. Monoreactive nonconjugated dienes have one double bond which readily enters the copolymerization reaction with ethylene and propylene, and a second double bond which does not, to any appreciable extent, enter the copolymerization reaction. Copolymers of this class have maximum side chain unsaturation for a given diene content, which unsaturation is available for adduct formulation. Gel content of these copolymers is also minimal since there is minimal cross-linking during copolymerization. The nonconjugated dienes include linear aliphatic dienes of at least six carbon atoms which have one terminal double bond and one internal double bond, and cyclic dienes wherein one or both of the carbon-to-carbon double bonds are part of a carbocyclic ring. Of the linear dienes, copolymers of ethylene, propylene, and 1,4-hexadiene are especially preferred.

Class of cyclic dienes useful for adduct formation includes alkylidene bicycloalkenes, alkenyl bicycloalkenes, bicycloalkadienes, and alkenyl cycloalkenes. Representative of alkylidene bicycloalkenes are 5alkylidene-2-norbornenes such as 5-ethylidene-2-norbornene and 5-methylene-2-norbornene. Representative of alkenyl bicycloalkenes are 5-alkenyl-2-norbornenes such as 5-(1'-propenyl)-2-norbornene, 5-(2'-butenyl)-2-norbornene, and 5-hexenyl-2-norbornene. Dicyclopendadiene and 5-ethyl-2,5-norbornadiene are illustrative of bicycloalkadienes, and vinyl cyclohexene is representative of alkenyl cycloalkenes which may be selected as the diene monomer.

Another class of preferred copolymers includes branched tetrapolymers made from ethylene, at least one $C_3$ to $C_6$ α-monoolefin with propylene being preferred, at least one monoreactive nonconjugated diene, and at least one direactive nonconjugated diene such as 2,5-norbornadiene or 1,7-octadiene. By "direactive" is meant that both double bonds are capable of polymerizing during preparation of the copolymer. Tetrapolymers of this class preferably have an inherent viscosity of about 1.2 to 3.0, as measured on 0.1 gram copolymer dissolved in 100 milliliters of perchloroethylene at 30° C., for optimum processing properties. A preferred copolymer of this class is a tetrapolymer of ethylene, propylene, 1,4-hexadiene, and 2,5-norbornadiene. Such copolymers are described in Canadian Pat. Nos. 855,774 and 897,895.

The adducts used in this invention can be prepared by any process which intimately mixes maleic or fumaric anhydride with the copolymer without appreciable generation of free radicals, and which concurrently or subsequently heats the mixture to a temperature at which thermal addition occurs. Selected temperatures will generally be at least 225° C. to obtain adduct formation at acceptable rates and less than about 350° C. to avoid any significant polymer breakdown. Preferred temperature ranges will vary with the particular polymer and can readily be determined by one skilled in the art.

Mixing of the anhydride and copolymer can be by blending molten anhydride with copolymer in an internal mixer or extruder, or by blending finely divided dry maleic anhydride with copolymer on a well-ventilated rubber mill with concurrent or subsequent heating, such as in a hot press or mold. Temperatures necessary to achieve thermal grafting are sufficiently high to dehydrate the diacid, forming the anhydride in situ. Thus, diacid can be compounded with the copolymer instead of the anhydride when such is desired.

Preferred copolymers of ethylene, propylene, and 1,4-hexadiene are very resistant to free radical formation under high shear stress conditions and are readily mixed on conventional bulk processing equipment without gel formation. Care must be exercised, however, in selecting the mixing conditions for copolymers derived from strained ring dienes such as ethylidene norbornene. Such copolymers will readily generate free radicals when sheared at low temperatures, and are preferably mixed with the anhydride at high temperature, such as above 90° C. to avoid appreciable gel formation.

It is generally desired to form adducts containing about 0.5 to 9 percent, and preferably about 1 to 4 percent, by weight anhydride.

To prepare the melt compounded blends of this invention, the polyamide and the adduct are mixed by any usual means and melt extruded through an extruder. This procedure is referred to herein as "melt compounding". If the adduct is in finely ground, i.e., less than 0.5 micron in size, it can be mixed directly with the polyamide and extruded. If, however, it is in coarse or pellet form, it is preferable to first mix and extrude it with the polyamide in amounts of about 10–20 percent to form a concentrate, and then mix and extrude the concentrate with additional polyamide. When in this coarse form, an extruder must be employed which will masticate, or grind, the adduct into a size less than 0.5 micron. Such an extruder is a twin screw extruder. Ordinarily, the ingredients are dry blended and then extruded at a temperature above the melting point of the polyamide.

The blends of this invention may contain one or more conventional additives such as stabilizers and inhibitors of oxidative, thermal, and ultraviolet light degradation; lubricants and mold release agents, colorants including dyes and pigments, fibrous and particulate fillers and reinforcements, plasticizers, and the like. These additives are commonly added during the mixing step.

Representative oxidative and thermal stabilizers which may be present in blends of the present invention include Group I metal halides, e.g., sodium, potassium, lithium with cuprous halides, e.g., chloride, bromide, iodide; hindered phenols, hydroquinones, and varieties of substituted members of those groups and combinations thereof.

Representative ultraviolet light stabilizers, include various substituted resorcinols, salicylates, benzotriazoles, benzophenones, and the like.

Representative lubricants and mold release agents include stearic acid, stearyl alcohol, and stearamides. Representative organic dyes include nigrosine, while representative pigments, include titanium dioxide, cadmium sulfide, cadmium selenide, phthalocyanines, ultramarine blue, carbon black, and the like. Representative fillers include carbon fibers, glass fibers, amorphous silica, asbestos, calcium silicate, aluminum silicate, magnesium carbonate, kaolin, chalk, powdered quartz, mica, feldspar, and the like.

EXAMPLES

In the Examples which follow, the concentration of anhydride functionally in the adduct was measured by pressing it to form a film. The film was then subjected to infrared wavelengths in an infrared spectrometer and the maximum infrared value of the anhydride was compared to a standard to determine the degree of anhydride functionality present.

Tensile strength and elongation measurements were made by ASTM D638 on ⅛-inch thick specimens pulled at 2 inches per minute, and Izod impact strength was determined by ASTM D256 on ⅛-inch thick specimens, except that specimens were used dry as molded.

Mold shrinkage was determined by measuring the length of five ⅛-inch thick tensile test bars and subtracting the average from the length of the mold cavity. The difference is divided by the length of the cavity to give mold shrinkage in dimensionless units of in/in. All measurements were at room temperature.

Particle size of the adduct was determined by making photographs with a transmission electron microscope. Specimens were cut from molded test bars with an ultramicrotome at -90° C. Sections were stained overnight with phosphotungstic acid before examination. The magnification was 11,800× (1.18 cm = 1 micron). Particles of the adduct polymer are white. By visually examining the photograph's average particle size is estimated.

The following adducts were employed:

Adduct Polymer 1A

A polymer of fumaric acid grafted onto a polymer of ethylene, propylene, 1,4-hexadiene and norbornadiene was prepared. Analysis for anhydride functionally provided a result of 0.31 meq/g acid.

Adduct Polymer 1B

Another sample of the same polymer as in Adduct Polymer 1A was prepared. The anhydride functionality was 0.71 meq/g acid.

In the Examples and controls, the appropriate adduct was mixed with nylon pellets or powder by tumbling in a polyethylene bag.

Adducts 1A and 1B were obtained in pellet form, and to ensure good mixing, a two-step mixing procedure was employed. A 10 percent by weight mixture of adduct in the nylon was first obtained by tumbling and extrusion. Then this 10 percent mixture was diluted with more nylon and tumbled and extruded again to obtain blends of desired adduct concentration. The pellet blends were extruded at 270° C. in a 28 mm Werner and Pfleiderer twin screw extruder.

The extrusion blends prepared were molded by injection molding. A melt temperature of 285° C., a mold temperature of 90° C., and an injection melt pressure of 10,700 psi were employed at a cycle time of 50 seconds.

EXAMPLE 1

Properties of Nylon 66 Containing Adduct Polymer 1A (EPHDE-g-F)

| Adduct Concentration | | Tensile Strength psi | Elongation % | Izod Impact Strength Ft lb/in |
|---|---|---|---|---|
| Wt % | Acid Eq/10⁶g | | | |
| None[1] | | 11,800 | 67 | .9 |
| .25[2] | .78 | 12,300 | 37 | .85 |
| .5[2,3] | 1.55 | 12,600 | 39 | .85 |
| .75[2] | 2.33 | 12,500 | 39 | .85 |

| Adduct Concentration | | Mold Shrinkage in/in | Particle Size of Adduct in the Molding (microns) |
|---|---|---|---|
| Wt % | Acid Eq/10⁶g | | |
| None[1] | | .016 | — |
| .25[2] | .78 | .014 | <.5 |
| .5[2] | 1.55 | .013 | <.5 |
| .75[2] | 2.33 | .012 | <.5 |

[1]Nylon 66 control (Zytel® 101)
[2]These also contained .3 percent N-stearyl erucamide lubricant for mold release.

As seen from the Table, the adduct increased tensile strength and decreased elongation and mold shrinkage.

EXAMPLE 2

Properties of Nylon 66 Containing Adduct Polymer 1B

| Adduct Concentration | | Tensile Strength psi | Elongation % | Izod Impact Strength Ft lb/in |
|---|---|---|---|---|
| Wt % | Acid Eq/10⁶g | | | |
| None[1] | | 12,000 | 65 | 1.0 |
| .3 | 2.1 | 12,800 | 31 | 1.0 |
| .9 | 6.3 | 12,900 | 26 | 1.1 |

| Adduct Concentration | | Mold Shrinkage in/in | Particle Size of Adduct in the Molding(micron) |
|---|---|---|---|
| Wt % | Acid Eq/10⁶g | | |
| None[1] | | .017 | — |
| .3 | 2.1 | .015 | — |
| .9 | 6.3 | .013 | <.5 |

[1]Nylon 66 control (Zytel® 101)

As seen from the table, the same results are generally obtained as with Example 1.

The embodiments of the invention in which an exclusive property or privilege is claimed are as follows:

1. A melt compounded blend consisting essentially of
   (a) a polyamide resin having a molecular weight of at least 5000, and
   (b) an adduct of maleic or fumaric anhydride and a copolymer of ethylene, at least one $C_3$ to $C_6$ α-olefin, and at least one nonconjugated diene, said adduct having an anhydride functionality of between about 0.1 and 4.0 milliequivalents of carboxyl groups per 1 gram of adduct, said adduct being present in the blend in an amount such that the anhydride functionality comprises between about 0.7 and 10 equivalents per $10^6$ g of polyamide present; provided that the maximum amount of adduct present is less than 1 percent based on weight of polyamide and adduct; and provided that the adduct is in the form of finely divided particles having an average size less than 0.5 micron.

2. The blend of claim 1 wherein the anhydride functionality in the adduct is between about 0.1 and 2 milliequivalents per gram and the adduct is present in an amount such that the amount of carboxyl groups available for anhydride functionality comprises between about 0.7 and 7 equivalents of carboxyl groups per $10^6$ g of polyamide present, provided the maximum amount of adduct present is less than 1 percent based on weight of polyamide and adduct.

3. The blend of claim 2 wherein copolymer of the adduct is a copolymer of ethylene, propylene, and at least one linear aliphatic diene of at least 6 carbon atoms.

4. The blend of claim 3 wherein the diene is 1,4-hexadiene.

5. The blend of claims 3 or 4 wherein the adduct is derived from maleic acid.

6. The blend of claims 3 or 4 wherein the adduct is derived from fumaric acid.

7. Process for preparing the blend of claim 1 wherein components (a) and (b) of claim 1 are physically mixed and then melt extruded.

8. Process for molding a polyamide resin which comprises melt extruding the melt compounded blend defined in claim 1 into a mold.

* * * * *